United States Patent [19]
Pearl

[11] 3,789,716
[45] Feb. 5, 1974

[54] DEVICE FOR CUTTING SHEET MATERIAL

[75] Inventor: David R. Pearl, West Hartford, Conn.

[73] Assignee: Gerber Garment Technology, Inc., East Hartford, Conn.

[22] Filed: Dec. 11, 1972

[21] Appl. No.: 314,129

Related U.S. Application Data

[62] Division of Ser. No. 59,899, July 31, 1970, Pat. No. 3,735,660.

[52] U.S. Cl. ............... 83/747, 83/761, 83/925 CC
[51] Int. Cl. ...................... B26d 1/10, A41h 43/00
[58] Field of Search... 83/925 CC, 559, 560, 747, 83/758, 761, 762, 781, 783

[56] References Cited
UNITED STATES PATENTS
1,172,058  2/1916  Scheyer ...................... 83/925 CC
3,465,630  9/1969  Bruns ........................... 83/925 CC

*Primary Examiner*—J. M. Meister
*Attorney, Agent, or Firm*—McCormick, Paulding & Huber

[57] ABSTRACT

A device for cutting sheet material, such as a layup of fabric sheets spread on a cutting table, includes a cutter head movable over the table and having a vertically reciprocating knife or other similar cutting tool. The cutter head is moved by numeric control relative to the table to cause its tool to follow a desired line of cut, and associated therewith is a guide or receiver which moves both longitudinally and transversely of the table in unison with the tool, between the supporting surface of the table and the bottom layer of the material, and receives the lower or distal end of the cutting tool to provide additional support for the tool and to inhibit tool deflection.

9 Claims, 11 Drawing Figures

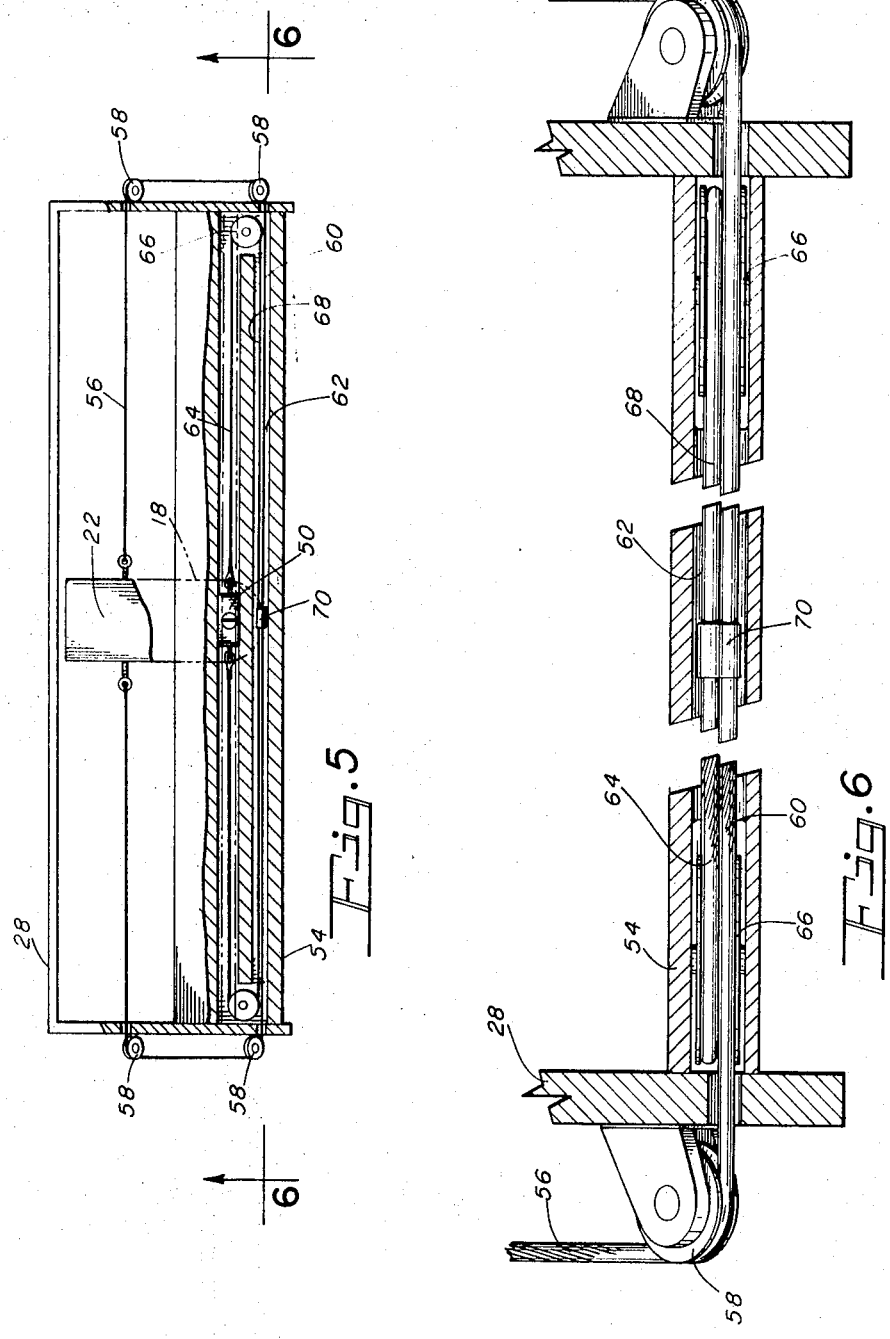

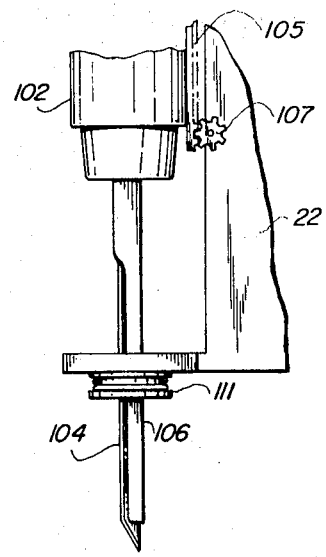
Fig. 9
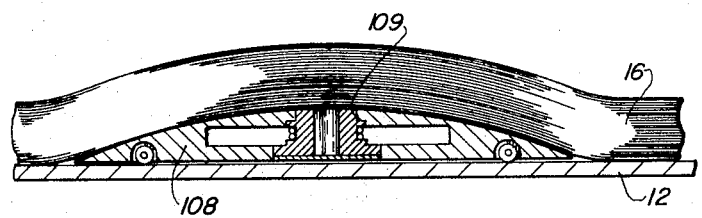
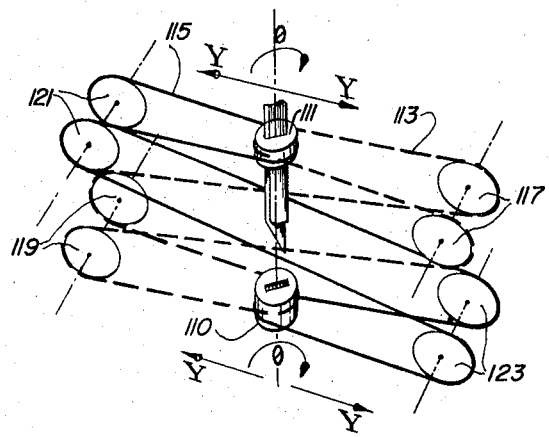
Fig. 11

DEVICE FOR CUTTING SHEET MATERIAL

CROSS REFERENCE TO RELATED APPLICATION

This application is a division of application Ser. No. 059,899, filed July 31, 1970 now U.S. Pat. No. 2,735,660.

BACKGROUND OF THE INVENTION

This invention relates to devices for cutting sheet material, particularly material which is by itself relatively thick or which is comprised of a large number of individually thin layers laid up on top of one another to form a relatively thick layup.

The cutting device of this invention has particular utility in the cutting of layups of fabric such as are used when making clothing, upholstery or the like, but may also be used for the cutting of various other different sheet materials. In the cutting of fabric layups it is customary to spread the fabric onto a cutting table and to then cut it by means of a hand-guided cutter including an electrically powered vertically reciprocating cutting blade. When material is cut by such a reciprocating blade, it is necessary that the blade in the lowermost extent of its stroke extend at least a small distance beyond the lower layer or surface of the material in order that the full thickness of the layup be cut. In the hand-guided cutting tool, the projection of the blade below the lower surface of the layup is accommodated by a base on the cutter which moves between the supporting surface of the table and the lower surface of the material. The base is connected to the main portion of the cutting tool, which includes the motor and other parts and which is located above the layup, by a relatively sturdy sheath which partially surrounds the blade and which extends through the slit in the fabric made by the blade.

The present invention relates to a cutting device which uses a vertically reciprocating blade, which is particularly adapted for use with a numerical controller for dictating its movement, and which is not dependent on the use of a relatively sturdy sheath for moving a base or other receiver for the lower end of the cutting blade in unison with the blade and the remainder of the cutter. Therefore, in the device of this invention, the blade sheath may be made of a relatively small size to make the blade capable of cutting sharp corners and of otherwise being easily maneuvered through the fabric. Alternatively, the sheath may be eliminated entirely, or at least be made vertically movable with the blade from the material being cut, making it possible to execute plunging cuts with the blade to start a cut from any point in the layup rather than requiring a cut to be always started from the edge of the layup as is the case when a base or bottom member is connected to the upper portion of the cutter by a sheath fixedly connected to both such parts.

In the cutting of some materials a reciprocating blade which is merely cantilevered from the cutter head without being restrained at its bottom end may tend to deflect away from its desired cutting axis as it is moved through the layup and, therefore, may not provide a straight cut through the entire thickness of the layup causing a piece cut from an upper layer of the layup to differ in shape and size from a piece cut from a bottom layer of the layup. In accordance with this invention, therefore, a guide is engageable with the lower or bottom end of the blade and is moved in unison, both longitudinally and transversely of the supporting surface for the material being cut, with the movement of the upper portion of the cutter so that the blade is supported and moved at both of its ends to prevent deflection of its lower end.

SUMMARY OF THE INVENTION

This invention resides in a cutting device for cutting sheet material such as fabric layups and wherein a supporting surface is provided for supporting the sheet material to be cut in a spread condition. A cutter head is located outwardly beyond the supporting surface and has a reciprocating cutting tool which extends toward the supporting surface so as to cuttingly engage the sheet material spread thereon. The cutter head is supported for movement both longitudinally and transversely of the supporting surface to enable the cutting tool thereof to follow any desired line of cut on the layup. Associated with the cutter head is a bottom guide or receiver which moves below the lower layer of the material to be cut. This guide is connected with the cutter head for movement both longitudinally and transversely of the supporting surface in unison therewith. In accordance with a specific embodiment of the invention this guide may be received in a slot provided by a bottom member moving between the supporting surface and the material to be cut. The bottom member is narrow in the dimension longitudinally of the supporting surface and it and its slot extend transversely of the supporting surface. The bottom member is moved longitudinally of the supporting surface in unison with the movement of the cutter head longitudinally of the supporting surface, and the guide is moved transversely of the supporting surface by sliding along the slot of the bottom member in unison with the movement of the cutter head transversely of the supporting surface.

BRIEF DESCRIPTION OF THE DRAWINGS

FIG. 5 is a view, somewhat similar to FIG. 2, but with various parts being broken away and with others being omitted to show various details of the cable drive system between the cutter head and the guide for the distal end of the cutter tool.

FIG. 6 is an enlarged vertical sectional view taken on the line 6—6 of FIG. 5.

FIG. 9 is a view similar to FIG. 8 but shows the cutting tool and sheath moved to a raised position above the top surface of the material to be

FIG. 11 is a somewhat schematic view illustrating the cable mechanism utilized for moving the guide transversely and rotationally in unison with the transverse and rotational movement of the blade.

DESCRIPTION OF THE PREFERRED EMBODIMENTS

Figure 1:
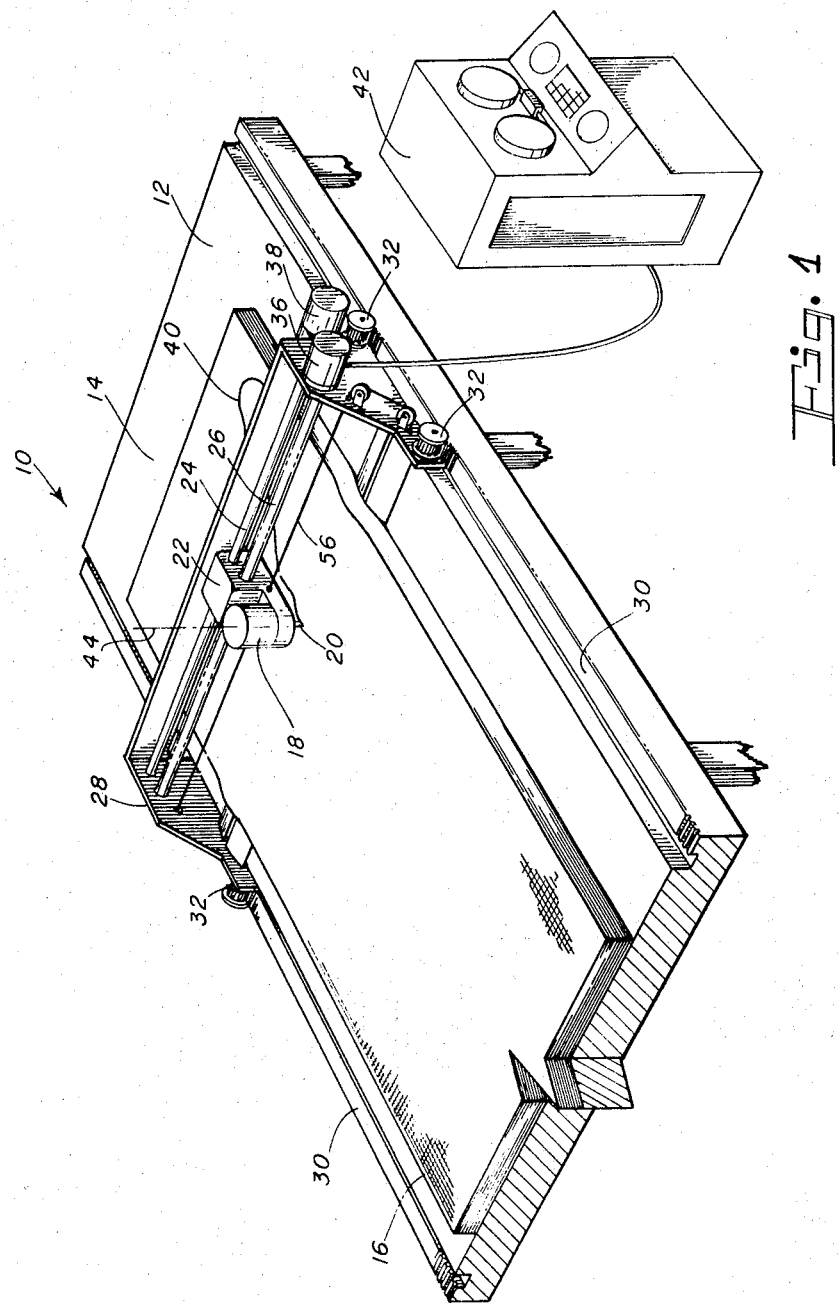
FIG. 1 is a perspective view showing a cutting device embodying this invention.

A cutting device embodying this invention and particularly adapted to the cutting of layups of fabric such as used for making clothing or upholstery is shown at 10 in FIG. 1. Considering FIG. 1 in more detail, the device 10 includes a table 12 having an upwardly facing flat supporting surface 14 for supporting the sheet material to be cut. In FIG. 1 such material is shown to consist of a layup 16 of a large number of individual layers of fabric spread over the supporting surface 14. The table 12 may be of a relatively long length and may be generally similar to the spreading and cutting tables presently often used in large scale cloth cutting operations. During the cutting operation, the layup 16 remains stationary on the supporting surface 14.

For performing the actual cutting of the layup 16 the device 10 of FIG. 1 includes a cutter head 18 which is supported above the surface 14 and includes a cutting tool in the form of a reciprocating blade 20 which extends downwardly from the cutter head toward the surface 14 so as to be cuttingly engageable with the layup 16. The cutter head 18 is mounted for movement transversely of the table 12 by being fixed to a sub-carriage 22 which in turn is supported for transverse movement relative to the table by suitable guide means such as a guide tube 24 and a lead screw 26. The guide tube 24 and lead screw 26 are supported and carried by a main carriage 28 which straddles the table and is supported for movement longitudinally thereof by two racks 30, 30 on opposite sides of the table and toothed wheels or pinions 32, 32 carried by the carriage 28 and meshing with the racks. As shown best in FIG. 2, two of the pinions 32, 32, which are located on opposite sides of the carriage 28, are connected with one another by a transversely extending axle 34 to which both such pinions are fixed so as to be constrained to rotate in unison thereby maintaining the carriage 28 in true alignment with the longitudinal axis of the table 12 and preventing it from skewing.

Transverse movement of the cutter head 18 relative to the supporting surface 14 is obtained by rotating the lead screw 26 which is driven by an associated motor 36, and longitudinal movement of the cutter head relative to the table is obtained by a motor 38 which drives the axle 34 to cause both of the attached pinions 32, 32 to rotate and travel along the racks 30, 30 thereby moving the carriage 28 longitudinally. Therefore, it will be understood that by combined operation of the motors 36 and 38, the cutter head 18 may be caused to move along any desired line of cut in the plane of the supporting surface 14, one such line of cut being indicated at 40. Operation of the motors 36 and 38 is controlled by an associated automatic controller indicated at 42. The controller 42, may, for example, be a numerical controller operating in response to input information supplied by a magnetic tape reader, punched tape reader or other input device to drive the cutter head 18 along a desired line.

Of course, it should be understood that the illustrated means for moving the carriage 28 longitudinally of the table and the sub-carriage 22 transversely of the table are intended to be exemplary only and many other suitable and different constructions of such means may be employed without departing from the invention. For example, the drive for moving the carriage 28 longitudinally may, if desired, consist of only one rack and one pinion used in association with other means for guiding the carriage along a straight longitudinal path without skewing.

Depending on various factors, such as the size, shape and material of the blade, the feed rate and the nature of the material being cut, the cutting blade 20 of FIG. 1 if unrestrained at its lower or distal end may, to an undesirable degree, tend to deflect away from its nominal cutting axis as a result of pressures applied thereto by the layup 16 and arising from movement of the cutter head relative to the layup. For example, from FIG. 1, it will be understood that if the lower end of the blade 20 is unrestrained and the cutter head is moved either to the left or right of the position shown, the blade as a result of its engagement with the layup will tend to deflect to the right or left by bending away from its nominal cutting axis. In FIG. 1, the nominal cutting axis is indicated generally at 44 and is the longitudinal axis of the blade when the blade is in its normal undeformed state. It will also be understood that the cutter head 18 includes a mechanism for both reciprocating the blade 20 and for rotating it about the nominal cutting axis 44 in order to maintain the blade generally tangent to the line of cut. It will also be appreciated that in order to cut through the full thickness of the layup it is necessary for the blade 20 in the lowermost extent of its stroke to extend at least slightly beyond the lower layer of the layup, and also at the cutting zone it is necessary for the bottom layer of the layup to be adequately vertically supported so that the blade when moving downwardly will move past and cut such layer rather than merely displace it downwardly.

Figure 2:
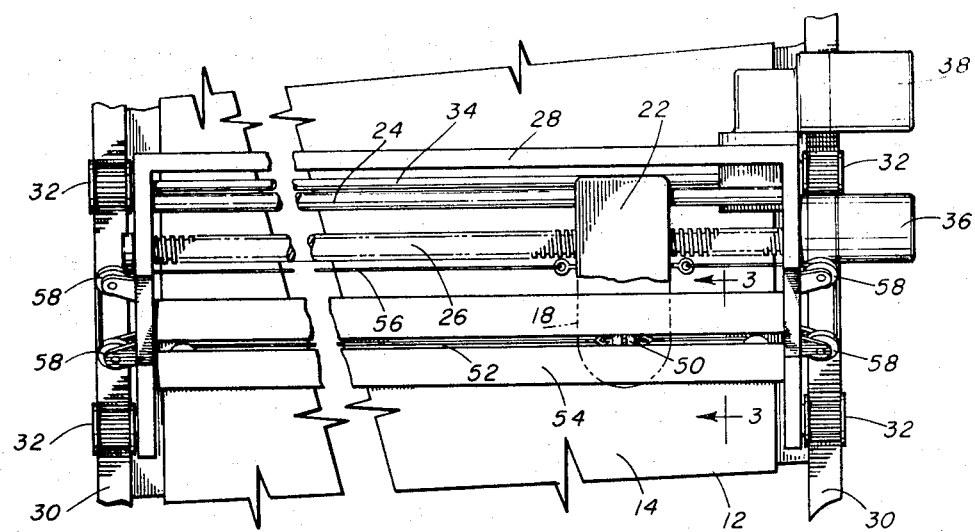
FIG. 2 is an enlarged plan view showing a portion of the cutting device of FIG. 1.
Figure 3:
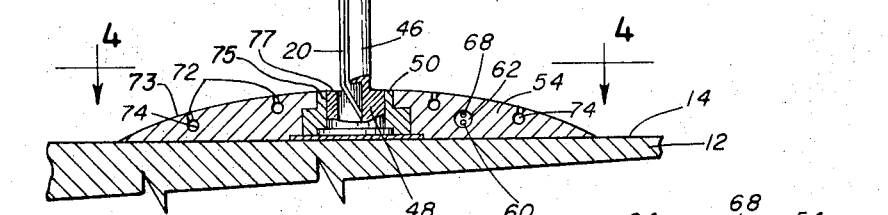
FIG. 3 is a still further enlarged vertical sectional view taken on the line 3—3 of FIG. 2.
Figure 4:
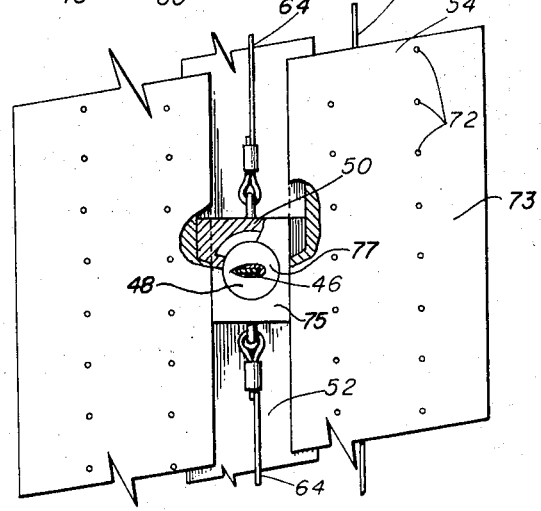
FIG. 4 is a plan view taken on the line 4—4 of FIG. 3.

In order to prevent deflection of the lower end of the blade while also supporting the material to be cut at the cutting zone and allowing the blade to move beyond the lower surface of the material, the device 10 in accordance with this invention includes a guide which is engageable with the lower end portion of the blade and which restrains such lower end portion to the position of the guide, the guide in turn being moved in unison with the movement of the cutter head 18 so that the lower end of the blade is supported by the guide and forced by the guide into alignment with the nominal cutting axis. Referring to FIGS. 2, 3 and 4, the guide in the illustrated case comprises a sheath 46 which not only engages the lower end portion of the blade but which may and preferably does, as shown, extend along the full length of the blade and is attached at its upper end to the cutter head 18. The sheath 46 includes a longitudinally extending slot which receives the major portion of the blade leaving the sharp edge 29 of the blade exposed. That is, the sheath engages both the rear edge and both lateral faces of the blade and prevents it from deflecting relative to the sheath both laterally and rearwardly.

As its lower end, the sheath 46 is fixed to a generally cylindrical head 48 which is received in a conforming circular recess in a guide block 50, the sheath 46 and head 48 therefore being free to rotate relative to the block 50 to permit rotation of the blade about the nominal cutting axis 44. The guide block 50 is received in a slot 52 in a bottom member 54, both of which extend transversely of the table, so that as the guide block 50 is moved along the length of the slot 52, the head 48, the sheath 46 and the lower end of the blade 20 are likewise moved transversely of the bottom member 54.

As shown in FIG. 1 the bottom member 54 is adapted to pass between the supporting surface 14 and the bottom surface of the layup 16. If desired, and as shown in FIGS. 3 and 4, means may be provided for ejecting air from the top surface of the bottom member to reduce the friction between the bottom member and the layup by creating an air cushion therebetween. Such means include a plurality of small orifices 72, 72 in the bottom member communicating with its top surface 73 and with air distributor channels 74, 74 passing transversely through the bottom member and connected to a suitable source of air under pressure.

To provide support for the material being cut at the cutting zone the guide block 50 has an upper surface 75 flush with the surface 73 and the cicular head 48 likewise has an upper surface 77 flush with the surface 75, as best shown in FIG. 3. Also as shown in FIG. 3, which shows the blade 20 in the lowermost extent of its stroke, the circular head 48 accommodates the lower end of the blade and permits it to project beyond the lower surface of the material being cut.

The movement of the guide block 50 is coordinated with the movement of the cutter head 18 by a cable drive system illustrated best in FIGS. 5 and 6. Referring to these figures, a first cable 56 is connected at its opposite ends to opposite sides of the sub-carriage 22 and by means of pulleys 58, 58 on the main carriage 28 is trained into a loop including one straight section 60 which passes through an opening 62 in the bottom member 54. A second cable 64 has its opposite ends fixed to the opposite sides of the guide block 50 and is trained into a loop by two pulleys 66, 66 carried by the bottom member. The cable 64 therefore includes one straight section 68 which is also located in the opening 62 together with the section 60 of the cable 56. Within the opening 62 the two cables 56 and 64 are joined to one another by a connector 70. From FIGS. 5 and 6, it will therefore be obvious that as the cutter head 18 is moved to the right, the section 60 of its associated cable 56 is moved to the left and moved with the latter, through the connector 70, is the section 68 of the cable 64. This movement of the cable 64 therefore causes the guide block 50 to also be moved to the right in unison with the movement of the cutter head. Similarly, the movement of the cutter head to the left causes movement of the guide block 50 to the left to maintain it aligned with the cutter head.

Figure 7:
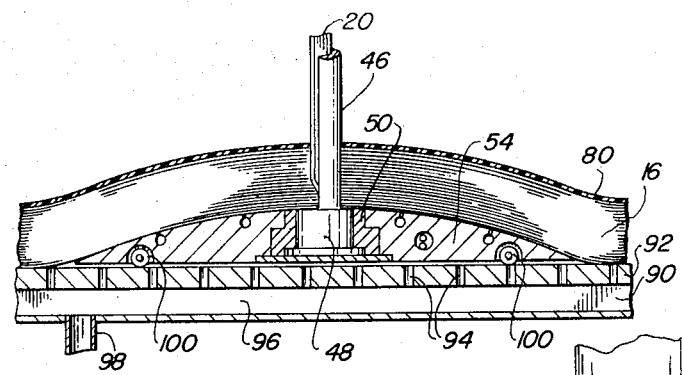
FIG. 7 is a view similar to FIG. 3 but shows another embodiment of the cutting device of this invention including a vacuum means for holding the material to be cut tightly in place on the supporting surface.

In the device 10 of FIGS. 1 to 6, the material to be cut, as evident from FIG. 1, is placed on the table 12 without the use of any supplementary means for holding it to prevent it from possibly shifting as a result of forces imposed thereon by the blade. If desired, however, the cutting device of this invention may include any suitable means for providing a holddown for the material to restrain it against shifting. A preferred form of such means is shown in FIG. 7 and consists of a sheet of air-impervious material, such as a sheet of polyethylene, indicated at 80, spread over the top of the layup 16 and used in conjunction with a table 90 including means for supplying a vacuum to its supporting surface. Such vacuum supplying means may take many different forms, and in the illustrated case the table 90 includes a top plate 92 containing a large number of perforations or passageways 94, 94 which provide communication between the supporting surface and a vacuum chamber 96 located below the plate 92. The vacuum chamber 96 is, in turn, connected to a suitable source of vacuum by a conduit 98. As a result of the vacuum applied to the top or supporting surface of the plate by the apertures 94, 94, atmospheric pressure urges the air-impervious overlying sheet 90 downwardly toward the supporting surface and compresses the layup 16 between it and the supporting surface to hold it relatively rigid in place. Because of the increased pressure on the bottom member 54 due to the vacuum holddown, the bottom member, as shown in FIG. 7, preferably includes a number of wheels or rollers such as indicated at 100, 100 to enable it to be moved more easily relative to the table. The other portions of the cutting device shown in FIG. 7 are or may be similar to that shown in FIGS. 1 to 6, and in FIG. 7 those parts which are the same as corresponding parts of the device 10 of FIGS. 1 to 6 have been given the same reference numerals as the parts of FIGS. 1 to 6 and need not be further described.

In the device 10 of FIGS. 1 to 6, as well as the device illustrated in FIG. 7, it will be noted that the sheath 46 is vertically immovable and is fixed both to the cutter head 18 and the cylindrical head 48. Therefore, when initiating a cut with the device 10 it is necessary that such cut always be started from an edge of the layup 16. In many instances, it may be desirable to be able to initiate a cut from a point located at some distance from any edge of the layup, and to accomplish this it is necessary that the blade and its sheath, if any, be vertically movable relative to the supporting table and the fabric layup so that it may be moved upwardly to withdraw it entirely from the layup and then moved downwardly to make a stabbing or plunging cut into the material. A cutting device so designed is shown in FIGS. 8 to 11.

Figure 8:
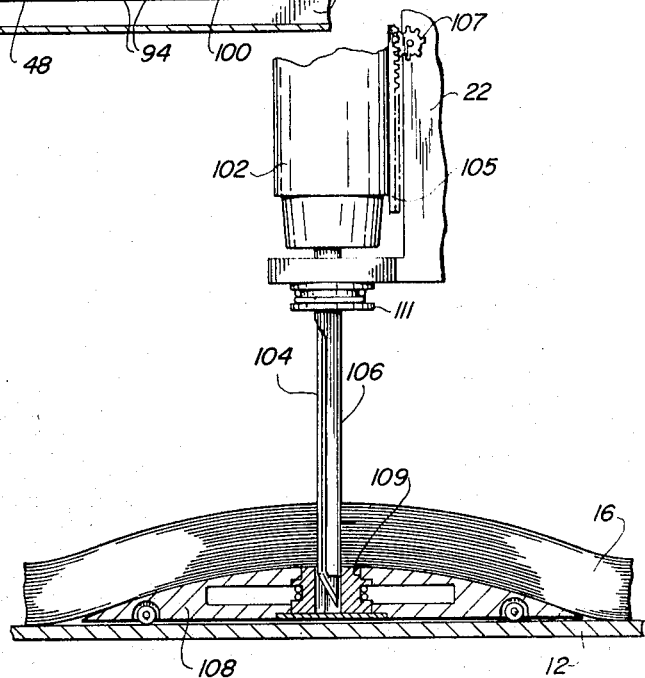
FIG. 8 is a view similar to FIG. 3 but shows a cutting device comprising still another embodiment of this invention.

Referring to FIGS. 8 to 11, the illustrated device includes a cutting table 12 and a cutter head 102, the cutter head having a vertically reciprocating blade 104 and an associated sheath 106. The table 12 is the same as the table 12 of FIG. 1 and the cutter 102 is or may be substantially similar to the cutter 18 of FIG. 1. The cutter head 102 is also movable longitudinally and transversely of the table 12 and the means for obtaining such movement are the same as those disclosed in FIG. 1, with the exception that the cutter head 102 is also supported for movement bodily vertically relative to the table 12 between a lowered position as shown in FIG. 8 and a raised position as shown in FIG. 9. For example, the cutter head 102 as shown in FIGS. 8 and 9 is moved vertically relative to the subcarriage by a rack 105 fixed to the cutter head and a pinion 107 carried by the sub-carriage and driven by a motor on the sub-carriage.

The device of FIG. 8 includes a bottom member 108, generally similar to the bottom member 54 of the device 10, having a slot 109 therein extending transversely of the table and receiving a cylindrical guide member 110. The slot 109 of the bottom member 108 and the guide member 110 are so relatively shaped that the guide member is restrained to movement along the length of the slot 109 while also being free to rotate about a vertical axis.

Figure 10:
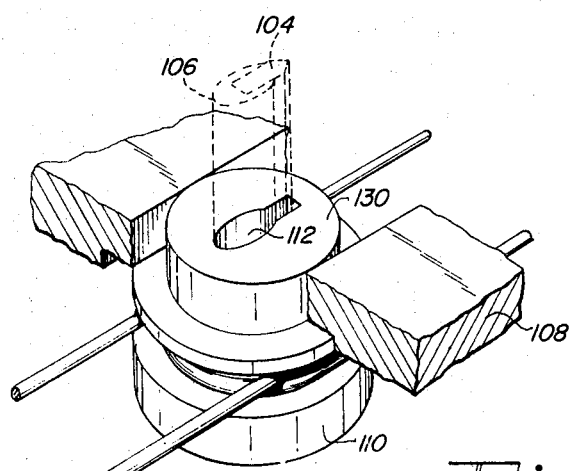
FIG. 10 is an enlarged perspective view of the tool guide used in the device of FIG. 8.

As shown in FIG. 10, the guide member 110 includes a vertically extending opening 112 having a shape conforming to that of the sheath 106 and also providing clearance for that portion of the blade 104 which projects forwardly beyond the sheath. When the sheath is in its lowered position, as shown in FIG. 8, the guide opening 112 receives the sheath and restrains its lower end to the position of the guide member. The sheath in turn restrains the blade 104, and as shown in FIG. 8 in the lowermost extent of its stroke, the blade 104 extends into the guide member 110.

The guide member 110 is moved along the length of the bottom member 108 in unison with the corresponding movement of the cutter head 102 transversely of the table 12, and in addition to this movement it is also rotated about its vertical axis ot maintain its opening 112 in proper angular position relative to the angular position of the blade 104 and sheath 108. That is, as the blade is rotated about a vertical axis the guide 110 is likewise rotated about a vertical axis in the same direction and to the same degree.

The means for moving the guide 110 to maintain it both angularly and laterally aligned with the blade and its sheath may take many different forms and may, for example, consist of a cable drive system generally similar to that shown schematically in FIG. 11. Referring to this figure, and also to FIGS. 8 and 9, the illustrated device includes a bushing 111 which is vertically fixed to the sub-carriage 22 but rotatable about a vertical axis. The blade and sheath 106 pass through a conforming opening in the bushing 111 and because of the non-circular cross-sectional shape of the sheath and the conforming opening in the bushing the bushing is rotated in unison with the rotation of the blade and sheath.

The bushing 111, as shown in FIG. 11, has trained about it two cables 113 and 115. To better distinguish the two cables from one another in FIG. 11 the cable 113 is shown in broken line and the cable 115 is shown in solid line. Both of the cables 113 and 115 are endless. The cable 113 extends from the bushing 111 to the right and passes over two pulleys 117, 117. From the pulleys 117, 117 it extends to the left and downwardly to two pulleys 119, 119, and from the pulleys 119, 119 it extends to the right to the guide member 110 about which it is trained. The cable 115 extends from the left of the bushing 111 to two pulleys 121, 121 and from such pulleys passes to the right and downwardly to two pulleys 123, 123. From the latter pulleys it passes to the left and is trained about the guide member 110. From a careful consideration of FIG. 11, it will therefore be obvious that as the bushing 111 is moved to the right or left, or in the illustrated Y direction, the cables 113 and 115 cause the guide member 110 to also be moved in the Y direction in unison with the movement of the bushing. Similarly, as the bushing 111 is rotated about the illustrated vertical axis θ, by rotation of the blade and sheath, the cables 113 and 115 cause the guide member 110 to also be rotated about the axis θ to maintain it angularly aligned with the bushing. Of course, it should be understood that FIG. 11 is intended to be schematic only and in an actual device additional pulleys may be used to guide the cables in paths somewhat different from those shown.

From the foregoing consideration of the device illustrated in FIGS. 8 to 11, it will be appreciated that the blade 104 and its sheath 106 may be moved downwardly from a position above the layup 16, as illustrated in FIG. 9, while the blade is reciprocated to cause the blade to move in a plunging fashion through the layup. As the lower end of the blade and its sheath reach the guide member 110, the guide member will be properly oriented to receive the blade and the sheath, the blade being received in the guide member when in the lower extent of its stroke, as shown in FIG. 8. Thereafter, as the blade is moved along a desired line of cut the guide member 110 is moved transversely of the table in unison with the transverse movement of the cutter head 102 to restrain the lower end of the sheath and the blade to the position of the cutter head and to thereby prevent deflection of the blade and consequent cutting errors. Also, the guide 110 includes an upwardly facing surface 130 which is flush with the top surface of the bottom member 108 and which acts to support the material being cut at the cutting zone to react the downward forces imposed thereon by the blade, thereby assuring that the bottom layer or layers of the material will be properly cut rather than being merely displaced into the slot 109.

I claim:

1. A cutting device for cutting sheet material, said device comprising means providing a supporting surface for supporting sheet material to be cut in a spread condition, a cutter head located outwardly beyond said supporting surface, said cutter head having a nominal cutting axis arranged generally perpendicular to said supporting surface and having a cutting tool which extends generally along said cutting axis toward said supporting surface so as to be cuttingly engageable with the sheet material spread thereover, said cutting tool terminating in a distal end portion at the end thereof nearer said supporting surface, means supporting said cutter head for movement relative to said supporting surface in a plane generally parallel thereto and including a first means for supporting and guiding said cutter head for movement transversely of said supporting surface, a cutting tool guide engageable with said distal end portion of said cutting tool for establishing its location relative to the plane of said supporting surface, means engageable with said guide adjacent said distal end portion of said cutting tool for moving said guide relative to said supporting surface in unison with the movement of said cutter head relative to said supporting surface so as to maintain said distal end portion of said cutting tool aligned with said nominal cutting axis, said latter means including a second means for supporting and guiding said cutting tool guide for movement transversely of said supporting surface, and a carriage movable longitudinally of said supporting surface, said first and second means both being fixed to said carriage so as to be moved longitudinally of said supporting surface in unison with one another as a result of longitudinal movement of said carriage.

2. A cutting device for cutting sheet material, said device comprising means providing a stationary supporting surface for supporting sheet material to be cut in a spread condition, a cutter head located outwardly beyond said supporting surface, said cutter head having a nominal cutting axis arranged generally perpendicular to said supporting surface and having a cutting tool which extends generally along said cutting axis toward said supporting surface so as to be cuttingly engageable with the sheet material spread thereover, said cutting tool terminating in a distal end portion at the end thereof nearer said supporting surface, means supporting said cutter head for movement both longitudinally and transversely of said supporting surface in a plane generally parallel to said supporting surface, a cutting tool guide located adjacent said supporting surface so as to be located below the sheet material spread on said supporting surface, said cutting tool guide being engageable with said distal end portion of said cutting tool for establishing its location relative to the plane of said supporting surface, and positioning means for moving said guide both longitudinally and transversely of said supporting surface in unison with the longitudinal and transverse movement of said cutter head relative to said supporting surface so as to maintain said guide aligned with said cutting axis, said positioning means for moving said guide both longitudinally and transversely of said supporting surface being located entirely below the sheet material supported on said supporting surface within the zone covered by said sheet material so that no portion of said positioning means passes vertically through the thickness of said sheet material.

3. A cutting device as defined in claim 2 further characterized by an elongated bottom member extending transversely of said supporting surface and providing a slot also extending transversely of said supporting surface, means for moving said bottom member longitudinally of said supporting surface in unison with the movement of said cutter head longitudinally of said supporting surface, said guide being received in said slot, and means for moving said guide by sliding it along said slot transversely of said supporting surface in unison with the movement of said cutter head transversely of said supporting surface.

4. A cutting device for cutting sheet material, said device comprising means providing a supporting surface for supporting sheet material to be cut in a spread condition, a cutter head located outwardly beyond said supporting surface, said cutter head having a cutting axis arranged generally perpendicular to said supporting surface and having a cutting tool which extends generally along said cutting axis toward said supporting surface so as to be cuttingly engageable with the sheet material spread thereover, said cutting tool terminating in a distal end portion at the end thereof nearer said supporting surface, means supporting said cutter head for movement both longitudinally and transversely relative to said supporting surface in a plane generally parallel thereto, a bottom member extending transversely of said supporting surface and adapted to reside between said supporting surface and the sheet material spread thereon, means for moving said bottom member longitudinally of said supporting surface in unison with the movement of said cutter head longitudinally of said supporting surface, said bottom member having a slot therein extending transversely of said supporting surface and aligned with the path of said cutting tool as said cutter head is moved transversely of said supporting surface, a guide member received in said slot for movement along the length thereof transversely of said supporting surface, and means for moving said guide member along said slot transversely of said supporting surface in unison with the transverse movement of said cutter head relative to said supporting surface, said guide member being aligned with said cutting tool and having an opening therein for receiving said distal end portion of said cutting tool.

5. A cutting device as defined in claim 4 further characterized by said guide member having a surface facing said cutting head generally flush with the surface of said bottom member on opposite sides of said slot for supporting said sheet material at the cutting zone.

6. A cutting device as defined in claim 4 further characterized by a sheath associated with said cutting tool and extending along the length thereof, means for moving said cutting tool and said sheath toward and away from said bottom member to bring said cutting tool into and out of cutting relationship with sheet material spread on said supporting surface, said sheath when said blade is in cutting relationship with sheet material spread on said supporting surface having such a length that it projects beyond the bottom surface of such material, said guide being shaped to receive that portion of said sheath which projects beyond said sheet material.

7. A cutting device for cutting sheet material as defined in claim 6 further characterized by said cutting tool comprising a reciprocating blade which is rotatable about said cutting axis, means supporting said guide member for rotation about said cutting axis, and means for rotating said guide member about said cutting axis in unison with the rotation of said blade about said cutting axis.

8. A cutting device for cutting sheet material as defined in claim 4 further characterized by said means for moving said guide member in unison with the transverse movement of said cutter head including a cable drive system connected between said cutter head and said guide member for transmitting the motion of said cutter head to said guide member.

9. A cutting device for cutting sheet material as defined in claim 4 further characterized by said cutting tool comprising a reciprocating blade which is rotatable about said cutting axis, means supporting said guide member for rotation about said cutting axis, and a cable drive system connected between said cutter head and said guide member for transmitting to said guide member both the movement of said cutter transversely of said supporting surface and the rotation of said blade about said cutting axis.

* * * * *